(12) United States Patent
Lair et al.

(10) Patent No.: US 7,516,975 B2
(45) Date of Patent: Apr. 14, 2009

(54) DRAWBAR PIN ADAPTER

(75) Inventors: Rodney D. Lair, Cedar Falls, IA (US); Michael Carl Harting, Jesup, IA (US); Deepak Bhoir, Mumbai (IN); Gerald Ray Kinney, Reinbeck, IA (US); Michael Kollath, Dunkerton, IA (US); Peter Kosmicki, Cedar Falls, IA (US); Scott L. Cook, Cedar Falls, IA (US); Christopher Alan Schafer, Traer, IA (US)

(73) Assignee: Deere & Company, Moline, IL (US)

( * ) Notice: Subject to any disclaimer, the term of this patent is extended or adjusted under 35 U.S.C. 154(b) by 63 days.

(21) Appl. No.: 11/846,614

(22) Filed: Aug. 29, 2007

(65) Prior Publication Data

US 2009/0058044 A1 Mar. 5, 2009

(51) Int. Cl.
*B60D 1/02* (2006.01)
(52) U.S. Cl. .................................... 280/515; 280/506
(58) Field of Classification Search ............... 280/515, 280/506, 504
See application file for complete search history.

(56) References Cited

U.S. PATENT DOCUMENTS

| | | | | |
|---|---|---|---|---|
| 2,482,907 A | * | 9/1949 | Hagen | 411/341 |
| 3,762,748 A | * | 10/1973 | Anders | 403/156 |
| 3,843,160 A | * | 10/1974 | Frushour et al. | 280/416.1 |
| 5,671,938 A | * | 9/1997 | Olson | 280/515 |
| 6,739,614 B2 | * | 5/2004 | Holmgren et al. | 280/515 |
| 6,758,486 B1 | * | 7/2004 | Kollath | 280/515 |
| 6,769,710 B1 | * | 8/2004 | Lim | 280/490.1 |

* cited by examiner

*Primary Examiner*—Tony H. Winner

(57) ABSTRACT

A drawbar pin adapter which can allow a smaller drawbar pin to be used with a larger drawbar. A drawbar pin adapter is provided for a tractor drawbar having a lower strap, an upper strap and a drawbar pin bore which extends through the upper and lower straps and which receives a drawbar pin. The adapter includes a cylindrical bushing mountable in the drawbar pin bore in the lower strap and a hollow housing which is mountable over the lower strap. The housing includes a lower plate, an upper plate and left and right side plates. The upper plate has an upper bore formed therein, and the lower plate has a lower bore formed therein. The upper and lower bores have a diameter which is smaller than an outer diameter of the bushing so that the upper and lower plates hold the bushing within the drawbar pin bore in the lower strap. The bushing and the upper and lower bores receive the drawbar pin when it is inserted through the upper and lower straps. A retainer retains the housing to the drawbar when the drawbar pin is removed from the drawbar pin bore. The retainer includes a cable coupled to the housing and looped around a portion of the drawbar.

12 Claims, 2 Drawing Sheets

DRAWBAR PIN ADAPTER

FIELD OF THE INVENTION

The present invention relates to a drawbar pin adapter.

BACKGROUND OF THE INVENTION

It is often necessary to attach a variety of different implements to vehicles such as agricultural tractors. Different implements require different sized drawbar pins. An operator may want to connect an implement which uses a small diameter drawbar pin to a tractor which has a larger diameter drawbar pin hole. An adapter is needed to couple such an implement to such a tractor.

SUMMARY OF THE INVENTION

Accordingly, an object of this invention is to provide an adapter which permits an implement which uses a small diameter drawbar pin to be coupled to a tractor which has a larger diameter drawbar pin hole.

This and other objects are achieved by the present invention, wherein an adapter is provided for a tractor drawbar having a lower strap, an upper strap and a drawbar pin bore extending through the upper and lower straps for receiving a drawbar pin. The adapter includes a cylindrical bushing mountable in the drawbar pin bore in the lower strap and a hollow housing which is mountable over the lower strap. The housing includes a lower plate, an upper plate and left and right side plates. The upper plate has an upper bore formed therein, and the lower plate has a lower bore formed therein. The upper and lower bores have a diameter which is smaller than an outer diameter of the bushing so that the upper and lower plates hold the bushing within the drawbar pin bore in the lower strap. The bushing and the upper and lower bores receive the drawbar pin when it is inserted through the upper and lower straps. A retainer retains the housing to the drawbar when the drawbar pin is removed from the drawbar pin bore. The retainer includes a cable coupled to the housing and looped around a portion of the drawbar. With this adapter, a Category 4 drawbar pin can be used with a tractor equipped with a Category 5 drawbar. The adapter can be removed to allow a larger Category 5 drawbar pin to be used if desired.

DESCRIPTION OF THE PREFERRED EMBODIMENT

Figure 1:
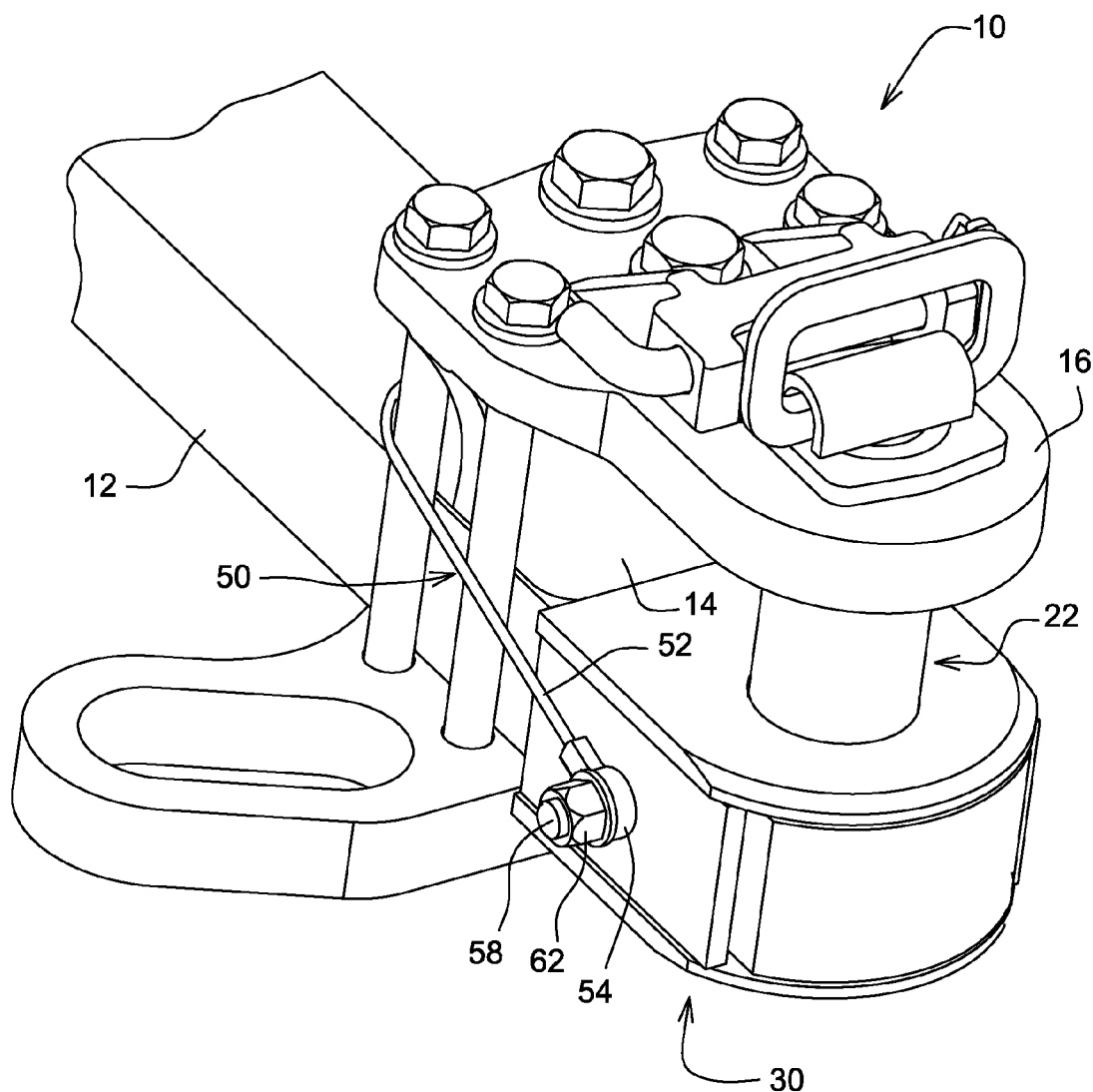
FIG. 1 is a perspective view of a drawbar pin adapter assembly according to the present invention, mounted on a drawbar.
Figure 2:
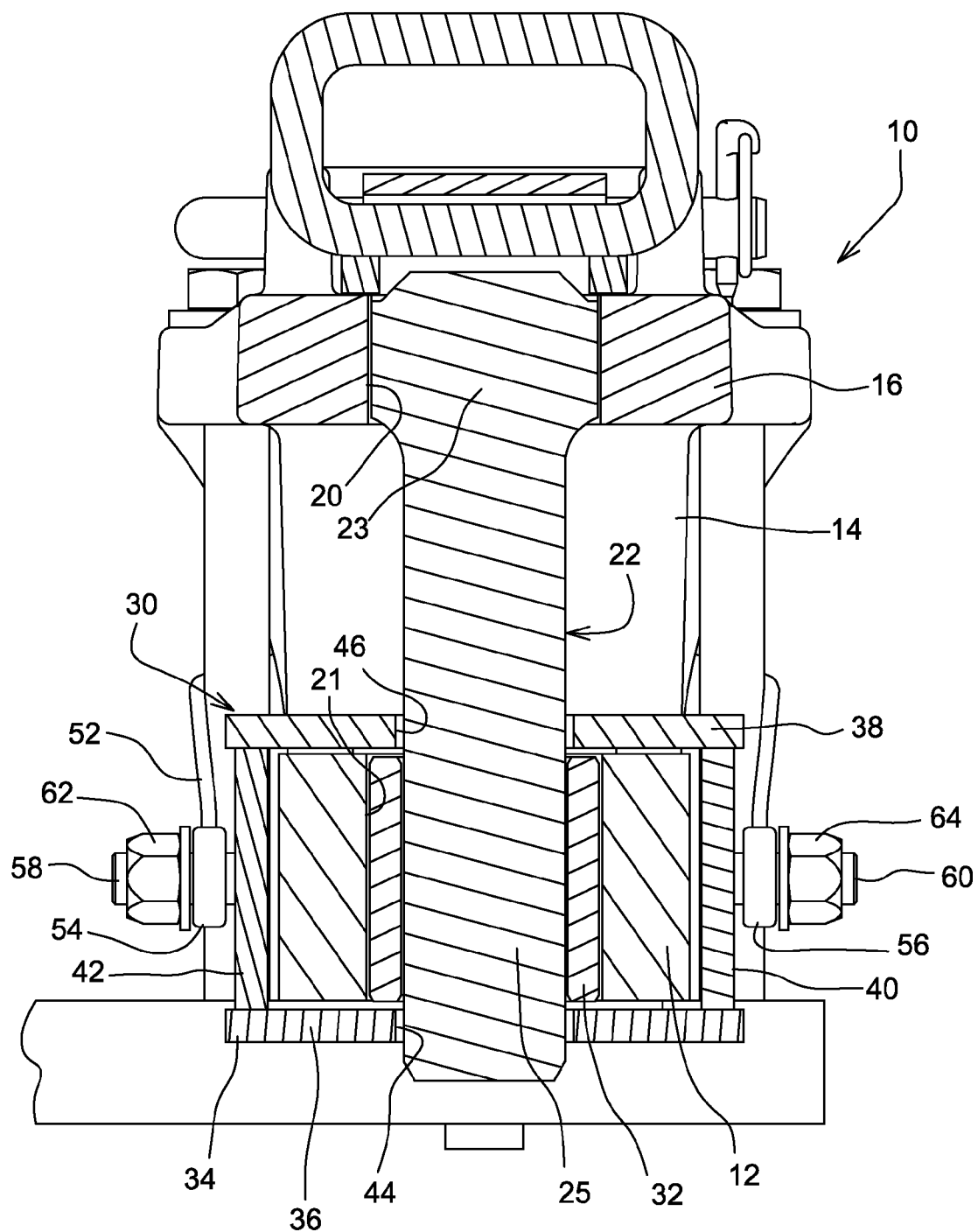
FIG. 2 is a sectional view of the drawbar pin adapter assembly of FIG. 1.

Referring to FIGS. 1 and 2, a drawbar 10 includes a lower strap 12, a post 14 and an upper strap or hammerstrap 16 bolted to a top surface of the post 14 and extending parallel to the rear end of the lower strap 12. A drawbar pin bore 20 extends through the hammerstrap 16. A drawbar pin bore 21 extends through the lower strap 12. The drawbar pin bores 20 and 21 are adapted to receive a conventional larger (Category 5) drawbar pin (not shown) in order to couple a Category 5 implement (not shown) to the drawbar 10.

In order to couple a smaller Category 4 implement (not shown) to the drawbar 10, a drawbar pin 22 is used. Pin 22 preferably includes a larger diameter (Category 5) head 23 and a smaller diameter (Category 4) shank 25. The head 23 is slidably received by into the bore 20 in the upper strap 16.

An adapter 30 includes a cylindrical bushing 32 which is mountable in the drawbar pin bore 20 in the lower strap 12. The bushing 32 has an outer diameter smaller than the inner diameter of the bore 20 and an inner diameter larger than the outer diameter of the drawbar pin shank 25. The bushing 32 slidably receives the drawbar pin shank 25.

The adapter 30 also includes a hollow housing 34 which is mountable over the lower strap 12. The housing 34 includes a lower plate 36, an upper plate 38 and left and right side plates 40 and 42. The lower plate 36 has a lower bore 44 formed therein, and upper plate has an upper bore 46 formed therein. The upper and lower bores 44 and 46 have a diameter which is smaller than an outer diameter of the bushing 32 so that the upper and lower plates 38 and 36 hold the bushing 32 within the drawbar pin bore 21 in the lower strap 12. The bushing 32 and the upper and lower bores 46 and 44 receive the drawbar pin 22 when it is inserted through the upper and lower straps 16 and 12.

When the drawbar pin 22 is removed from the drawbar 10, the adapter housing 34 can be slid off of the lower strap 12, and the bushing 32 can be removed from bore 21 in lower strap 12. A larger diameter (Category 5) drawbar pin (not shown) can then be inserted through the upper and lower straps 16 an 12 so that a different implement (not shown) requiring such a larger diameter drawbar pin can be coupled to the drawbar 10.

A retainer 50 removably holds the housing 30 on the strap 12. The retainer 50 includes a cable 52 with rings 54 and 56 attached to the ends thereof. The rings 54 and 56 are mounted over threaded studs 58 and 60 which are mounted to the side plates 42 and 40, respectively. The rings 54 and 56 are retained on the studs 58 and 60 by lock nuts 62 and 64. To disconnect the retainer 50, one of the lock nuts 62 or 64 is unscrewed from the corresponding stud 58 or 60, and the corresponding ring 54 or 56 is slid off of the stud 58 or 60. The cable 52 can then be unlooped from around the drawbar post 14 so that housing 30 can be removed from the drawbar strap 12.

With this adapter 30 in place on a Category 5 drawbar 10, a smaller Category 4 drawbar pin can be inserted through the bushing 32, so that the bushing 32 prevents the drawbar pin from moving around loosely in the larger diameter bore 20. If the adapter 30 and its bushing 32 are removed from the drawbar 10, a larger Category 5 drawbar pin (not shown) can be inserted into the drawbar 10.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A drawbar pin adapter for a tractor drawbar having a lower strap, an upper strap and a drawbar pin bore extending through the upper and lower straps for receiving a drawbar pin, the adapter comprising:

a cylindrical bushing mountable in the drawbar pin bore in the lower strap; and a hollow housing which is mountable over the lower strap, the housing comprising a plate having a bore formed therein, the bore having a diameter which is smaller than an outer diameter of the bushing so that the plate holds the bushing within the drawbar pin bore in the lower strap, the bushing and the bore receiving the drawbar pin when the pin is inserted through the upper and lower straps.

2. The adapter of claim 1, wherein the housing comprises:
a lower plate, an upper plate and left and right side plates, the upper plate having an upper bore formed therein, the lower plate having a lower bore formed therein, the upper and lower bores having a diameter which is smaller than an outer diameter of the bushing so that the upper and lower plates hold the bushing within the drawbar pin bore in the lower strap, the bushing and the upper and lower bores receiving the drawbar pin when the pin is inserted through the upper and lower straps.

3. The adapter of claim 1, further comprising:
a retainer for retaining the housing to the drawbar when the drawbar pin is removed from the drawbar pin bore.

4. The adapter of claim 3, wherein:
the retainer comprises a cable coupled to the housing and looped around a portion of the drawbar.

5. The adapter of claim 1, wherein:
the drawbar pin comprises a larger diameter head and a smaller diameter shank.

6. The adapter of claim 1, wherein:
the drawbar pin comprises a larger diameter head slidably received by the drawbar pin bore in the upper strap, and a smaller diameter shank slidably received by the bushing.

7. A drawbar pin adapter for a tractor drawbar having a lower strap, an upper strap and a drawbar pin bore extending through the upper and lower straps for receiving a drawbar pin, the adapter comprising:
a cylindrical bushing mountable in the drawbar pin bore in the lower strap;
a hollow housing which is mountable over the lower strap, the housing comprising a lower plate, an upper plate and left and right side plates, the upper plate having an upper bore formed therein, the lower plate having a lower bore formed therein, the upper and lower bores having a diameter which is smaller than an outer diameter of the bushing so that the upper and lower plates hold the bushing within the drawbar pin bore in the lower strap, the bushing and the upper and lower bores receiving the drawbar pin when the pin is inserted through the upper and lower straps.

8. The adapter of claim 7, further comprising:
a retainer for retaining the housing to the drawbar when the drawbar pin is removed from the drawbar pin bore.

9. The adapter of claim 8, wherein:
the retainer comprises a cable coupled to the housing and looped around a portion of the drawbar.

10. The adapter of claim 7, wherein:
the drawbar pin comprises a larger diameter head and a smaller diameter shank.

11. The adapter of claim 7, wherein:
the drawbar pin comprises a larger diameter head slidably received by the drawbar pin bore in the upper strap, and a smaller diameter shank slidably received by the bushing.

12. A drawbar pin adapter for a tractor drawbar having a lower strap, an upper strap and a drawbar pin bore extending through the upper and lower straps for receiving a drawbar pin, the adapter comprising:
a hollow bushing mountable in the drawbar pin bore in the lower strap;
an adapter member which is mountable to the drawbar, the adapter member having a plate having a bore formed therein, the bore receiving the drawbar pin, and the plate engaging an upper surface of the lower strap, and the plate being adjacent to an upper end of the bushing, the bushing and the bore receiving the drawbar pin when the pin is inserted through the upper and lower straps.

* * * * *